United States Patent [19]

Ishida et al.

[11] Patent Number: 4,870,504
[45] Date of Patent: Sep. 26, 1989

[54] IMAGE SCANNING APPARATUS INCLUDING MEANS FOR SELECTING ONE OF A PLURALITY OF SCANNING DRUMS TO BE SCANNED

[75] Inventors: Akira Ishida; Mikizo Katsuyama, both of Kyoto, Japan

[73] Assignee: Dainippon Screen Mfg. Co., Ltd., Japan

[21] Appl. No.: 126,873

[22] Filed: Nov. 30, 1987

[30] Foreign Application Priority Data

Dec. 2, 1986 [JP] Japan .................................. 61-288583

[51] Int. Cl.[4] .............................................. H04N 1/46
[52] U.S. Cl. ..................................... 358/489; 358/474
[58] Field of Search ............... 358/285, 289, 287, 290, 358/292, 293

[56] References Cited

U.S. PATENT DOCUMENTS

| | | | |
|---|---|---|---|
| 1,884,288 | 1/1930 | Schroter | 358/289 |
| 2,657,259 | 10/1949 | Hackenberg | 358/289 |
| 4,214,276 | 7/1980 | Pugsley | 358/285 |
| 4,327,380 | 4/1982 | Yamada | 358/289 |
| 4,342,052 | 7/1982 | Rockley | 358/287 |
| 4,388,653 | 6/1983 | Yamada | 358/296 |
| 4,570,187 | 2/1986 | Ono | 358/293 |
| 4,631,596 | 12/1986 | Yaguchi | 358/256 |
| 4,654,526 | 3/1987 | Nakaji | 358/289 |
| 4,679,093 | 7/1987 | Yaguchi | 358/257 |
| 4,684,979 | 8/1987 | Hirosawa | 358/287 |
| 4,686,580 | 8/1987 | Kato | 358/287 |
| 4,712,139 | 12/1987 | Kato | 358/257 |
| 4,733,304 | 3/1988 | Homma | 358/287 |

Primary Examiner—Edward L. Coles, Sr.
Assistant Examiner—Jerome Grant, II
Attorney, Agent, or Firm—Ostrolenk, Faber, Gerb & Soffen

[57] ABSTRACT

A drum scanning type image scanning apparatus comprises a disk form scanning drum holding means (30A) provided with a plurality of scanning drums (3) on the same circumference, a main scanning direction rotation means (10) for rotating scanning drums in the main scanning direction, a set of reading means (20, 26) for reading originals on the scanning drums, scanning drum selecting means (40) for successively exchanging the plurality of scanning drums held on the same circumference by rotating the disk form scanning drum holding means around the center of the disk, setup data holding means (100) for holding setup data of the originals arranged on the plurality of scanning drums, and control means (5, 100) for controlling the scanning drum holding means and original reading means such that the scanning drum holding means is rotated based on the setup data so that the desired scanning drum is selected and the desired original is read.

53 Claims, 9 Drawing Sheets

IMAGE SCANNING APPARATUS INCLUDING MEANS FOR SELECTING ONE OF A PLURALITY OF SCANNING DRUMS TO BE SCANNED

BACKGROUND OF THE INVENTION

1. Field of the Invention

The present invention relates to a drum scanning type image scanning apparatus such as a reproduction scanner and, more specifically, it relates to a drum scanning type image scanning apparatus which has a function of automatically selecting a plurality of scanning drums and automatically processing an original attached to the scanning drum.

2. Description of the Prior Art

An example of interest of a drum scanning type image scanning apparatus in relation to the present invention is disclosed in, for example, U.S. Pat. No. 4,684,979. The referenced U.S. Pat. No. 4,684,979 is entitled "System for Allocating Images onto Photosensitive Material Utilizing Flags" and issued to the same assignee of the present invention on Aug. 4, 1987. The above mentioned United States Patent is incorporated herein by reference.

Figure 1:
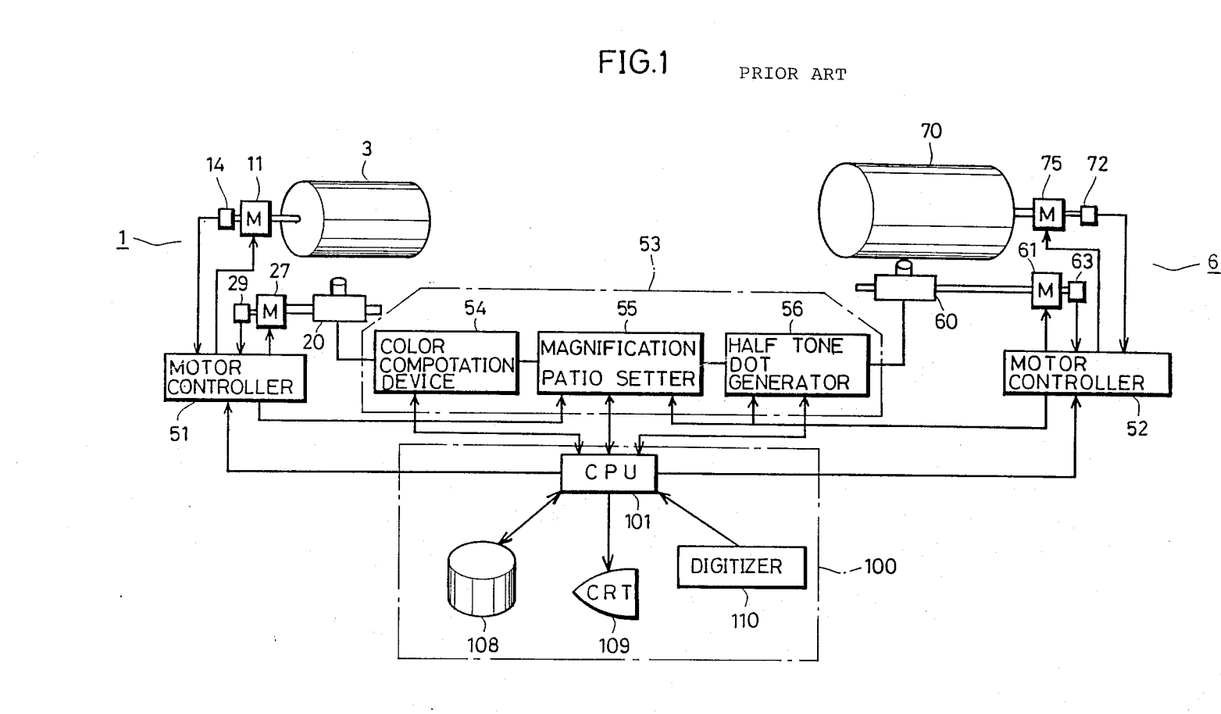
FIG. 1 is a block diagram showing the structure of a conventional drum scanning type image scanning apparatus.

FIG. 1 shows one example of a conventional drum scanning type image scanning apparatus shown in the above referenced United States Patent.

This drum scanning type image scanning apparatus comprises an image scanning station 1 for reading an original, an image recording station 6 for recording images based on the signal read in the image scanning station 1, a control circuit comprising motor controllers 51, 52 for controlling the operation of the image scanning station 1 and the image recording station 6, an arithmetic processing circuit 53 for carrying out color correction of the recorded images and a computer station 100 for controlling the operation of the control circuit 5 and the arithmetic processing circuit 53.

The image scanning station 1 comprises an scanning drum 3 for holding originals, a main scanning motor 11 for rotating the scanning drum 3 in the main scanning direction, an input scanning head 20 for reading originals and a subscanning motor 27 for moving the input scanning head 20 in the subscanning direction. The image recording station 6 comprises a recording head 60 for recording images on a photosensitive material according to the signals read by the input scanning head 20, a motor 61 for moving the recording head 60, a recording drum 70 for holding the photosensitive material and a motor 75 for rotating the recording drum 70. The control circuit comprises a scanning side motor controller 51' for controlling the scanning side motors such as the main scanning motor 11 and the subscanning motor 27 and a recording side motor controller 52' for controlling the reading side motors such as recording drum rotating motor 75 and the recording head motor 61. The arithmetic processing circuit 53 comprises a color computation device 54 for carrying out color correction, a magnification ratio setter 55 for setting the magnification ratio of the images and a half tone dot generator 56. The computer station 100 comprises a central processing unit CPU 101, an external memory device 108 for holding data and so on for processing originals, a cathode ray tube CRT 109 provided with a keyboard for providing input or correcting data and so on for processing the originals and a digitizer 110 for facilitating the data input.

While the scanning drum 3 is rotated in the main scanning direction and the input scanning head is moved in the subscanning direction, the highlight point, shadow point, magnification ratio, trimming point or the like (hereinafter referred to as setup data) of the original 4 held in the scanning drum 3 are inputted from the keyboard associated with CRT 109 for each of the originals. The layout of the exposed regions on the photosensitive material is carried out by the digitizer 110 and the CRT 109. This input data is temporarily held in an inner memory device of the CPU 101. When a plurality of originals 4 are held on the scanning drum 3 and the images are to be recorded together off-line afterward according to the inputted setup data, the stored data is outputted to the external memory device 108 by every data for each of the originals. When they are processed real time on-line, the CPU controls the arithmetic processing unit 53 and the recording side motor controller 52 based on the stored data and the desired reproduction images are recorded on the photosensitive material of the recording drum 70. The data stored in the inner memory device of the CPU 101 can be displayed on the CRT 109 to be corrected, if necessary. Images are recorded on the photosensitive material according to the corrected data. The off-line processing of the plurality of originals held in one scanning drum is performed as will be described below. All data for the originals are stored in the external memory device 108 and thereafter the above described necessary correction of data is carried out. Data for each of the originals 4 is inputted from the external memory device 108 to the inner memory device of the CPU 101. Next, the CPU 101 controls the arithmetic processing unit 53 and the recording side motor controller 52 according to the data and the desired image is recorded on the photosensitive material of the recording drum 70. Although the off-line image recording requires manual input of setup data, unmanned recording of the plurality of originals 4 held in one scanning drum 3 can be carried out thereafter.

However, in the above described method, since there are many pieces of setup data for each of the originals, input of the setup data requires a long period of time. As a result, the time for input scanning of images to be recorded is limited. Consequently, the efficiency of the device is limited.

In order to avoid the above problems, a setup data inputting device should be provided separately from the image scanning apparatus. Namely, the setup data for the originals should be previously inputted using the setup data input device and thereafter the data should be inputted to the image scanning apparatus. For this purpose, a setup device having a function of the setup data setting station of the image scanning and recording device has been recently developed for practical use. While a reproduction image of the original attached to a certain scanning drum is recorded in the image scanning and recording device, the setup data for the original attached to the next scanning drum is previously inputted to the setup device.

More specifically, the setup data corresponding to the next scanning drum is previously inputted to a memory medium such as a floppy disk of the setup device. When said scanning drum is mounted on the image scanning apparatus, the setup data is inputted to the data setting station of the image scanning apparatus through the memory medium. In this manner, the setup data setting time for each of the originals is saved, enhancing the operation efficiency of the image scanning apparatus.

When the process of recording the reproduced images for all of the originals is completed in the above described manner, the operator removes the scanning drum from the image scanning and recording apparatus. Thereafter, a new scanning drum, provided with subsequent originals is attached to the image scanning apparatus. The same operation as described above is repeated to record the prescribed reproduction images.

Since the above image scanning apparatus is generally expensive, there is a strong need for enhancing the efficiency of the device and for reducing the running cost. The unmanned automatical operation for a long period of time at night and after working hour is strongly desired.

However, a conventional image scanning apparatus could accommodate only one scanning drum at a time. As a result, unmanned operation of the image scanning apparatus for long periods of time was impossible.

SUMMARY OF THE INVENTION

Therefore, a main object of the present invention is to provide an image scanning apparatus which is capable of unmanned operation for a long time. The above object of the present invention can be attained by an image scanning apparatus holding a plurality of scanning drums wherein these scanning drums are automatically processed.

Briefly stated, the image scanning apparatus according to the present invention has such structure as will be described in the following. Namely, it comprises scanning drum holding means for holding a plurality of scanning drums, scanning drum selecting means for selecting an arbitrary one from the plurality of scanning drums, reading means for reading the original, setup data holding means operatively coupled to the original reading means and to the scanning drum selecting means for holding the setup data of the originals arranged on the plurality of scanning drums and control means for controlling the scanning drum selecting means and the original reading means for selecting the desired scanning drum according to the setup data and for reading the original.

In the image scanning apparatus of the present invention structured as above, an scanning drum selected from the plurality of scanning drums can be automatically processed.

According to a preferred embodiment, the image scanning apparatus comprises scanning drum holding means of a disk form provided with a plurality of scanning drums on the same circumference, main scanning rotation means for rotating one scanning drum in the main scanning direction, a set of reading means provided opposed to the scanning drum for reading the original on one scanning drum, scanning drum exchanging means for successively exchanging a plurality of scanning drums held on the same circumference by rotating the disk form scanning drum holding means in the central portion of the disk, setup data holding means for holding setup data of the originals arranged on the plurality of scanning drums and control means for controlling the scanning drum holding means and the original reading means such that the scanning drum holding means are rotated according to the setup data, the desired scanning drum is selected and the original is read. By structuring the image scanning apparatus as described above, the apparatus becomes simple and a plurality of scanning drums can be successively processed.

According to a more preferred embodiment, the scanning drum holding means of the image scanning apparatus comprises a flat plate form scanning drum holding means with a plurality of scanning drums arranged in a line extending in the left and right directions and the exchange of the scanning drums are performed by moving the flat plate in the left and right directions.

By structuring the image scanning apparatus as described above, the whole apparatus becomes compact and the exchange can be carried out easily.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the figures.

Figure 2:
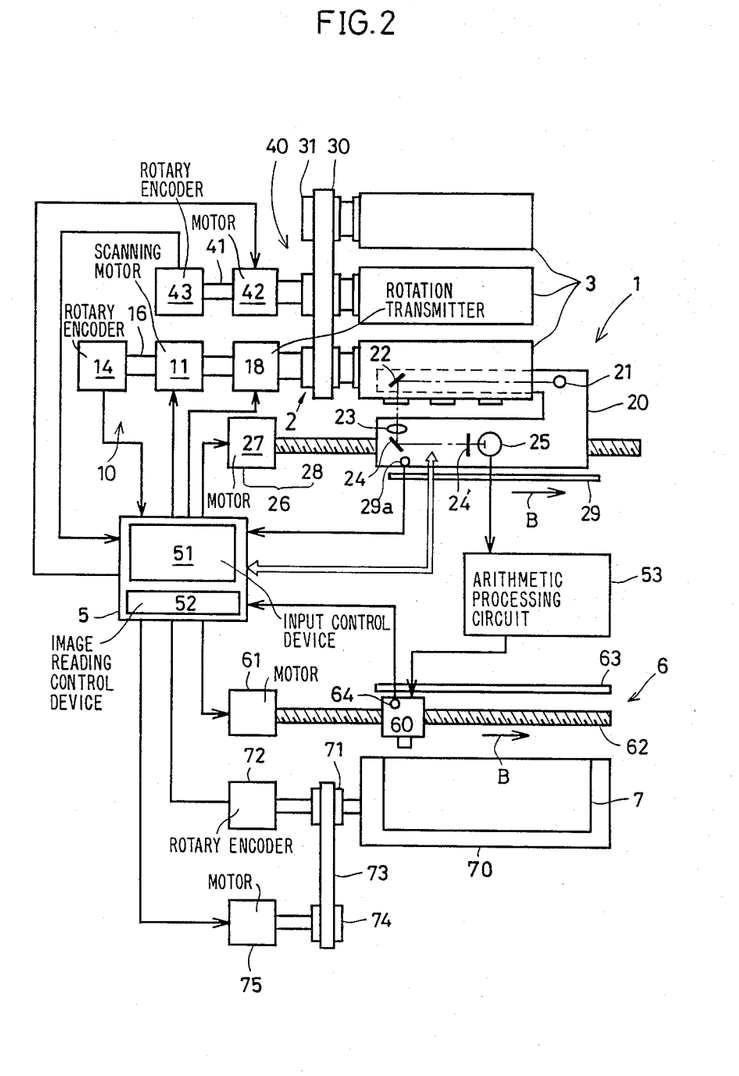
FIG. 2 is a schematic block diagram of the drum scanning type image scanning apparatus according to the present invention.

FIG. 2 is a block diagram showing one example of a reproduction color scanner to which the present invention is applied. This reproduction color scanner comprises a drum scanning type image scanning station 1 and an image recording station 6 and is controlled by the control circuit 5.

Figure 3:
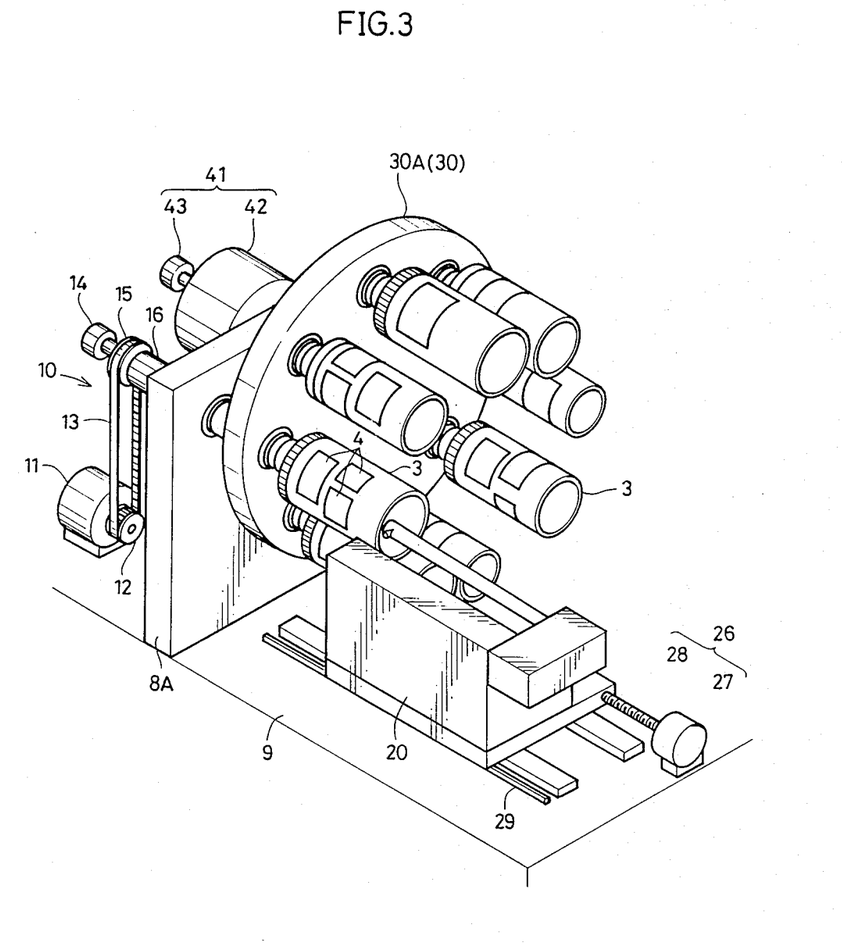
FIG. 3 is a perspective view of one embodiment of the drum scanning type image scanning apparatus according to the present invention.

As best shown in FIGS. 2 and 3, the drum scanning type image scanning station 1 according to a first embodiment of the invention comprises a plurality of scanning drums 3 mounted at spaced locations along the periphery of a drum holding means 30, a drum exchanging device 40 for rotating the drum holding means 30 about a central axis thereof so as to successively cause respective scanning drums 3 to be placed in a scanning position (the position of drum 3' in FIG. 3) adjacent an input scanning head 20, a main scanning drive device 10 for rotating the scanning drum 3 located at the scanning position in the main scanning direction via a respective scanning drum mate means 2 associated with each scanning drum 3 and a subscanning driving means 26 for moving the input scanning head 20 in the subscanning direction. The subscanning direction is the axial direction of the scanning drum 3 and the main scanning direction is the rotational direction of the scanning drum 3.

Each of the scanning drums 3 is normally provided with a plurality of originals 4 which are to be processed in the range of the same magnification ratio.

The main scanning driving device 10 comprises a main scanning motor 11, a main axle 16 and a rotary encoder mounted on one end of the main axle 16. The main axle 16 is rotated by a driving pulley 12, belt 13 and a driven pulley 15. The scanning drum mate means 2 associated with the scanning drum 3 located at the scanning position is rotated by the main scanning driving device 10 via a transmission clutch 44 (FIG. 4) which will be described in the following. The position of the scanning drum 3 in the main scanning direction can be detected by a counter of the image input control device 51 by counting clock pulses generated from the rotary encoder 14. The input scanning head 20 comprises a transmitted illumination system, a reflected illumination system (not shown) a photosensitive optical system and a photoelectric conversion device. The transmitted illumination system comprises a transparency original illuminating lamp 21 and a mirror 22 for receiving light from the illuminating lamp 21. By the transmitted illumination system, light from the illuminating lamp 21 is directed to the original 4 on the transparent scanning drum 3 through a lens (not shown) and the original 4 is illuminated by minute light points. The reflected illumination system (not shown) illuminates the minute points on the original 4 from outside of the scanning drum 3. The photosensitive optical system comprises a pick up lens 23 for receiving the transmitted light or reflected light illuminating the original 4, a mirror 24 and a color separation filter 24a.

In case of a color scanner, said photosensitive optical system normally requires at least three photosensitive optical systems for R (red), G (green) and B (blue). However, only one photosensitive optical system is shown to simplify the description.

The image signals of the original 4 are read by the input scanning head 20 through the above described transmitted illumination system or the reflected illumination system, the photosensitive optical system and the photoelectric conversion device.

The subscanning driving means 26 comprises a subscanning motor 27, a feed screw 28 for moving the input scanning head 20 in the drum axial direction, a linear encoder 29 and a detector 29a of the linear encoder.

The rotation of the feed screw 28 reduces the rotating speed of the motor 27. The subscanning position of the input scanning head 20 is detected by a counter of the image input control device 51 by counting the clock pulses generated from the detector 29a. Control of the moving distance of the input scanning head 20 in the subscanning direction is performed by said detector 29a.

The image signals taken by the input scanning head 20 are processed by the arithmetic processing circuit 53 in which known color correction or the like is carried out. Processed signals are applied to the recording head 60 of the image recording station 6 and required reproduction images are exposed and recorded on a photosensitive material attached to the recording drum 70.

The recording drum 70 is rotated by the driving of the motor 75 through the driving pulley 74, belt 73 and the driven pulley 71. A rotary encoder 72 is attached to the axis of the recording drum. The position of the recording drum 70 in the main scanning direction is detected by the counter of the image recording control device 52 counting the clock pulse generated from the rotary encoder 72 in the same manner as in the case of the above described image scanning station 1. The recording head 60 moves in the subscanning direction (arrow B). This movement is carried out by a feed screw 62 to which the rotation of the motor 61 is transmitted with the rotating speed reduced. On this occasion, clock pulses generated by the detector 64 of the linear encoder 63 is inputted to the image reading control device 52 and the subscanning position is detected in the same manner as described above. Correspondingly, the position control is carried out of the recording head 60 in the subscanning direction.

The drum holding means 30 holds the plurality of scanning drums 3 in a prescribed order. FIG. 3 shows one example. Referring to FIG. 3, a pivotally supported turnable drum turret 30A is employed as drum holding means 30.

Figure 4:
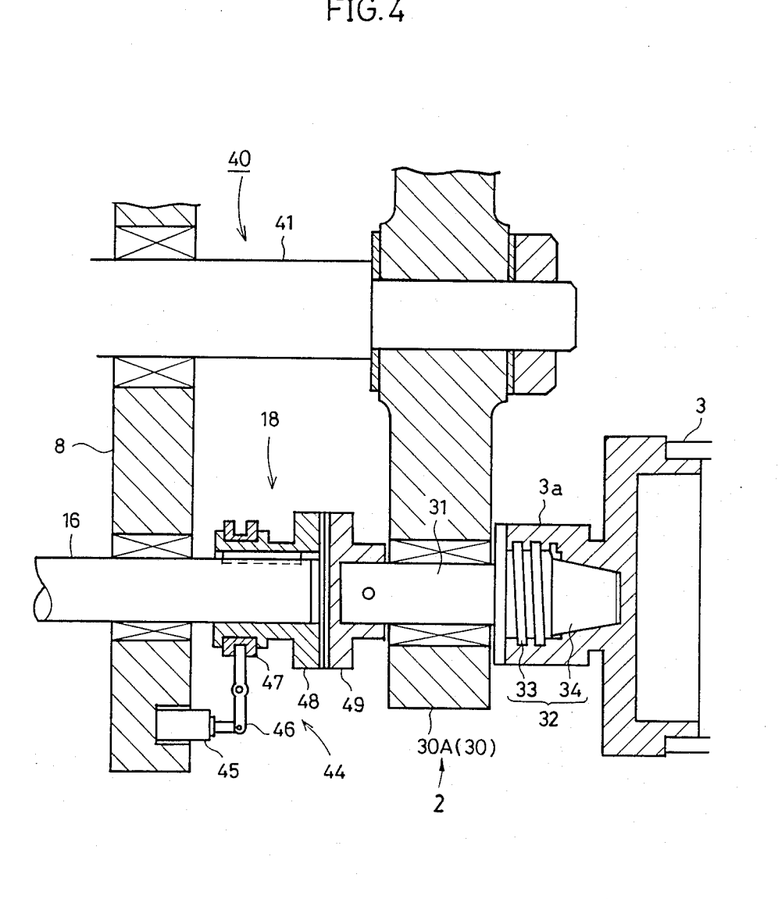
FIG. 4 is a cross sectional view of a main portion of the rotation transmitting portion of FIG. 3.

The drum turret 30A is pivotally supported enabling rotation about the rotary driving axle 41 supported by the supporting plate 8 as shown in, for example, FIG. 4. A plurality of scanning drums 3 are attached to the drum turret 30A concentrically with a prescribed space between each other through the scanning drum mate means 2.

Each of the scanning drum mate means 2 comprises an intermediate transmitting axle 31 provided rotatably on the drum turret 30A, at a location corresponding to its associated scanning drum 3 a drum mating portion 32 provided on one end of the intermediate transmitting axle 31 for mating to the scanning drum, and a friction plate 49 as each scanning drum mate means 2 is rotated into the scanning position (the position corresponding to drum 3' in FIG. 3), the friction plate 49 of that scanning drum mate means 2 comes into frictional engagement with a moveable friction plate 48. The friction plates 48 and 49 form part of a transmission clutch 44 provided on the other end of the intermediate transmitting axle 31 so as to connect the main scanning driving device 10 with the scanning drum 3 located at the scanning position. The drum mating portion 32 comprises a screw portion 33 and a tapered portion 34. The drum mating portion 32 has a convex form. This is to facilitate the centering of the drum mating portion 32 and the mating metal fitting 3a of the scanning drum 3. The scanning drum 3 is detachably attached to the screw portion 33 of the drum mating portion 32 through the mating metal fitting 3a.

The drum mate means 2 is provided at each position on the drum turret 30A which carries a scanning drum 3. As the drum turret 30A is rotated, each successive drum mate means 2 aligns with axle 16 and the rotational movement of axle 16 is transmitted to the respective drum 3 via the intermediate transmitter axle 31 of the drum mate means 2.

The drum exchanging device 40 serves to place successive scanning drums 3 in the scanning position and comprises a turret driving motor 42 (FIG. 2) rotating the drum turret 30A through the rotary driving axle 41, a rotary encoder 43 provided on the same axis with the rotary driving axle 41 and a transmitting clutch 44 (FIG. 4) provided on the rotation transmitting portion 18 of said main scanning driving device 10. The drum turret 30A is successively rotated so that the desired scanning drum 3 is positioned at the rotation transmitter position 18. Then, by activating the transmitting clutch 44, the intermediate transmitting axle 31 is coupled to the main axle 16 of the main scanning driving device 10. Thus, the rotary driving power is transmitted from the main axle 16 to the scanning drum 3. Meanwhile, the reference numeral 45 denotes an actuator, 46 denotes a swing arm, 46a denotes a fixed pin, 47 denotes a slider and 48 denotes a movable friction plate. In exchanging the scanning drum 3, the rod of the actuator 45 is extended in the direction of the arrow (FIG. 4) and the connection between the friction plate 49 and the movable friction plate 48 is released.

Figure 5:
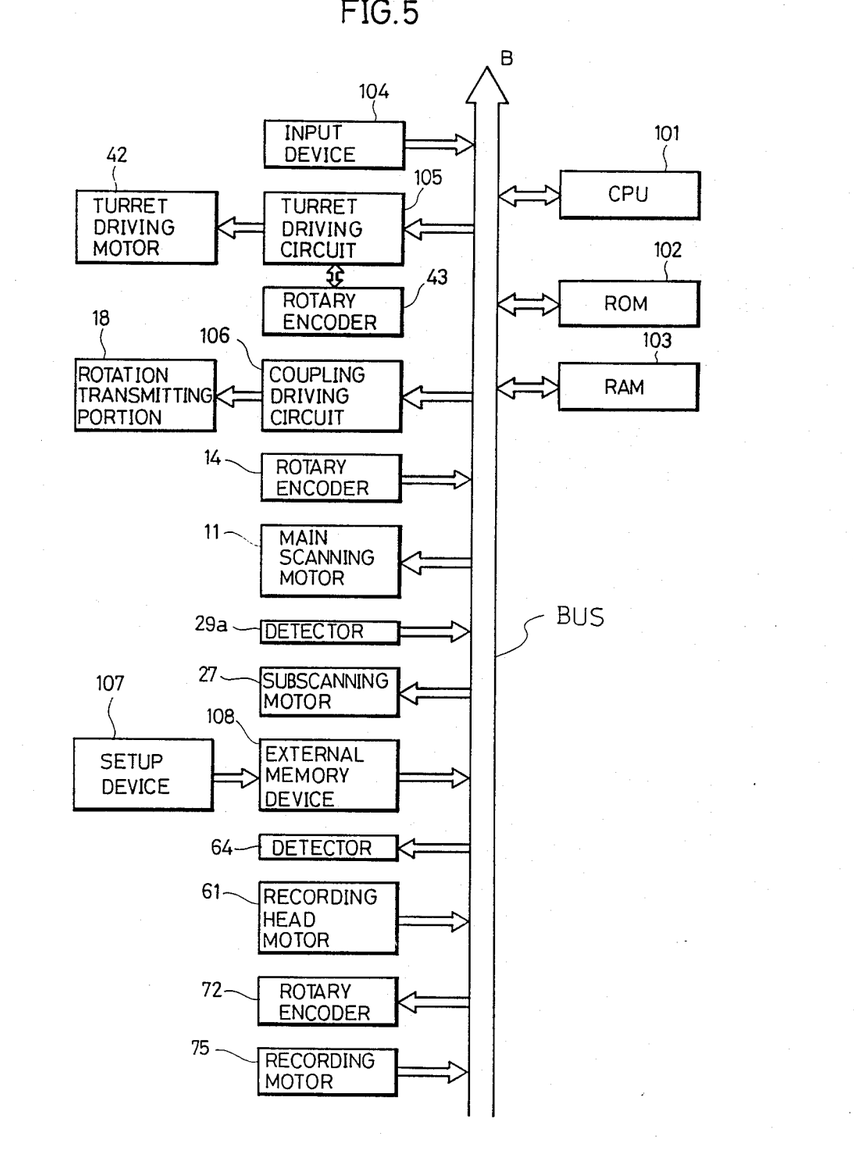
FIG. 5 is a block diagram describing the function of the image input control device shown in FIG. 2.

The image input control device 51 is a part of the control circuit 5 of FIG. 2. The image input control device 51 comprises a scanning side motor controller 51' and a micro computer. As shown in FIG. 5, the microcomputer system comprises a central processing unit CPU 101, a ROM 102 containing a control program and so on, RAM 103 to which various data for image input processing are written, an input device 104 including a keyboard, various control circuits and a bus line B connecting said components with each other.

A turrent driving circuit 105 is a circuit for rotating the drum turret 30A. The turret driving circuit 105 receives an instruction from the CPU 101 and drives the turret driving motor 42 so as to position the scanning drums 3 at a prescribed positions in response to the position signal from the rotary encoder 43.

A coupling driving circuit 106 is a circuit for coupling the main axis 16 of the main scanning driving device 10 and the intermediate transmitting axle 31 of the scanning drum mate means 2 in order to rotate the scanning drum mate means 2 in the main scanning direction. After confirming that the desired scanning drum 3 is positioned at the scanning position, the coupling driving circuit 106 activates the rotation transmitting portion 18 to couple the main axle 16 with the intermediate transmitting axle 31. When the scanning of all originals 4 attached to one scanning drum 3 is completed, the coupling driving circuit 106 activates the rotation transmitting portion 18 so as to release the coupling of the main axis 16 from the scanning drum 3 at the scanning position.

The setup data in relation to the image processing condition for each of the originals can be previously written in the RAM 103 through the input device 104. In this embodiment, a separated independent setup device 107 is employed. This setup device 107 is structured solely with the setup function of a conventional image scanning and recording device. One example of such setup device is disclosed in the United States Ser. No. 030,997 entitled "Method and Visual Monitoring Device for Setting Image Processing Conditions" filed on Mar. 27, 1987. The device has a data input portion for temporarily inputting a series of setup data groups and the setup data is stored with the number of each of the originals in the corresponding addresses of memory medium such as a magnetic disk.

Usually, in using the input processing device of the present invention, a plurality of originals in the range of a prescribed magnification rate are attached to the scanning drum. Various data are stored in the memory medium as the setup data for each of the originals attached to said scanning drum using the setup device 107. The various data comprises, distinction of the transmitted original/reflected original, positional information of the original, trimming information, and, if necessary, outputting position information, highlight density, shadow density, tone correction, color correction, tone processing such as the strength of USM, reproduction magnification rate, information of negative/positive, and so on. The memory medium with the data stored is set at the external memory device 108 of the control circuit 5.

The scanning drum 3 with the setup data inputted is attached to the drum turret 30A. The setup data for each of the originals are successively inputted to the RAM 103 of the image input control device 51. Input processing for the originals of said scanning drum is carried out. During the input processing of the scanning drum, prescribed originals are attached to the next new scanning drum. The setup data for these originals are inputted through the setup device 107. During the input processing, another scanning drum 3 is attached. The same operation is repeated, enabling high operation efficiency of the image scanning and recording apparatus.

Meanwhile, in the image scanning apparatus, if the time required for processing the scanning drum is longer than the time required for inputting setup data for a new scanning drum, the above described operation may be repeated. If the processing time is short, the setup device 107 may be added appropriately. As a result, scanning drums to be processed are always attached to the drum turret 30A, enabling high operation efficiency of the image scanning and recording apparatus.

In case of unmanned operation for a long time at night, for example, scanning drums 3 to be processed are attached in a prescribed order to the drum turret 30A at the end of the working day and the setup data corresponding to each of the originals are set in the image input control device 51 in the same order, and then input processing is successively carried out for each of the scanning drums. Alternatively, a plurality of originals are attached to each of the necessary scanning drums and the setup data for the originals corresponding to each of the scanning drums are previously stored in the memory medium together with the drum number, original number and so on through the setup device 107. Thereafter, the memory medium may be set at the external memory device 108 so that the data is read therefrom to the RAM 103 for successively carrying out the input processing of the originals attached to the scanning drums, if necessary.

The arrangement of the scanning drums on the drum turret 30A according to the order of inputted setup data is performed in the following manner. A serial number is attached to the drum mating portion 32 on the drum turret 30A in the direction of rotation. In the order of setup data input, the corresponding scanning drums are fitted on the positions of the corresponding number.

Figure 6:
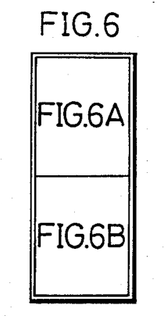
FIG. 6 is a flow chart showing the operating process steps of unmanned image input process for image recording.
Figure 6A:
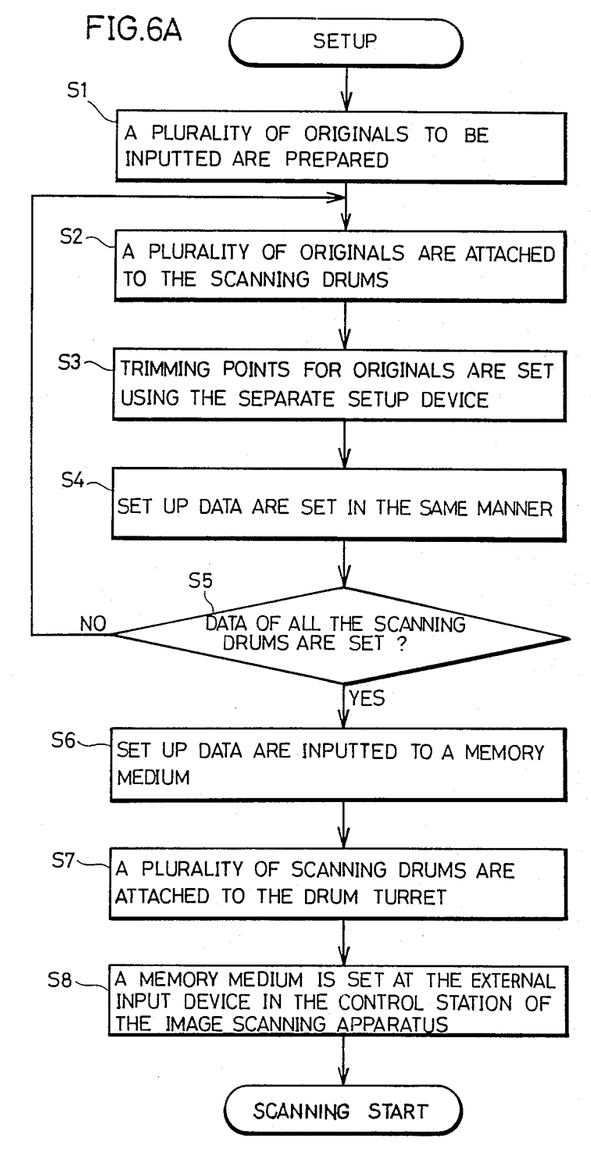
Figure 6B:
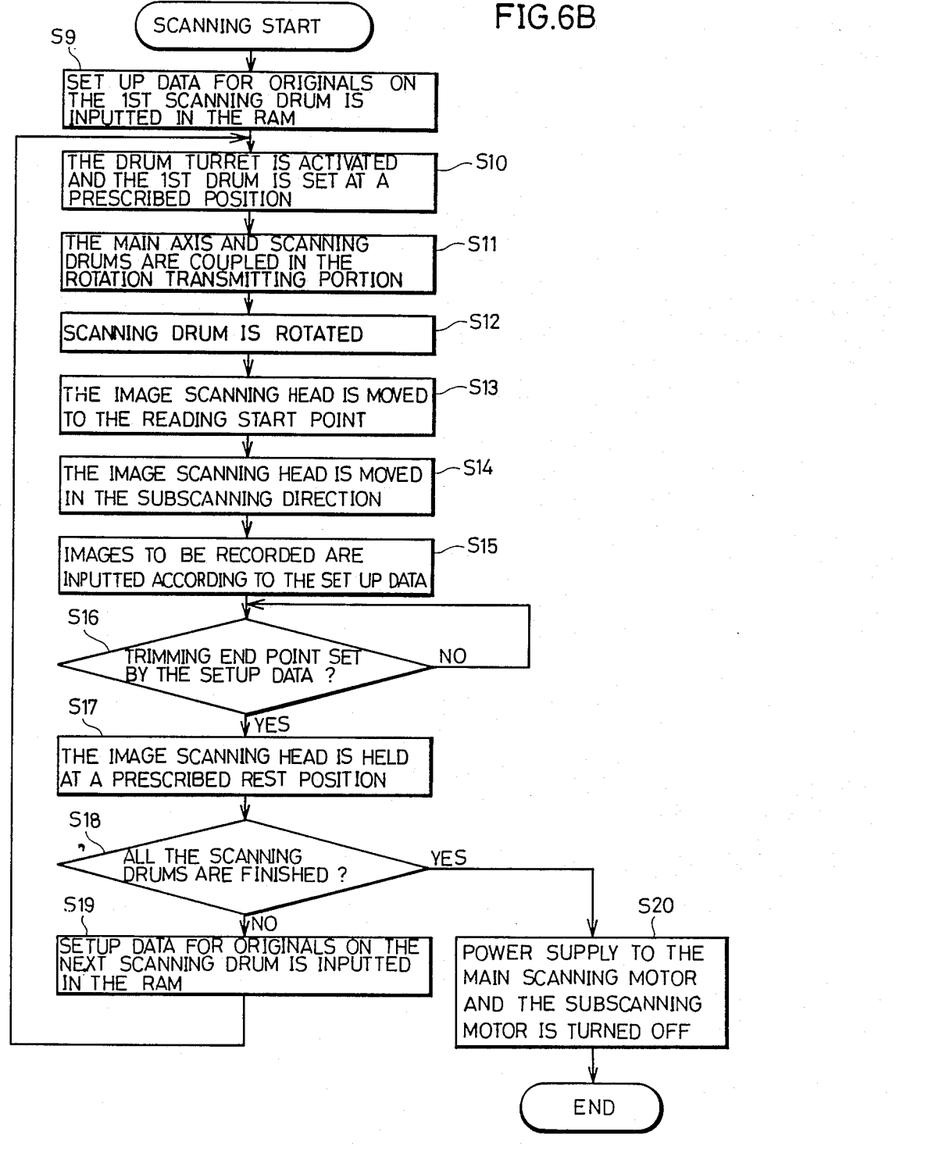

FIG. 6 is a flow chart showing steps of image input process for the above described unmanned operation.

A plurality of originals to be inputted are prepared (S1). A plurality of originals are attached to the scanning drums 3 according to the range of a prescribed magnification ratio (S2). Trimming points for all of the originals are set using the separate setup device (S3). Setup data such as highlight point, shadow point and the like are set in the same manner (S4). The above described operation of S2, S3 and S4 are repeated for all of the scanning drums (S5). The setup data are inputted to a memory medium (S6). The operation in the image scanning apparatus is carried out after this step.

After the completion of the above setup data input, a plurality of scanning drums are attached to the drum turret in order of setting the setup conditions (S7). The memory medium is set at the external input device in the control station of the image scanning apparatus (S8). The setup data for the originals on the first scanning drum, that is the drum having the number 1, is inputted in the RAM in the control station of the image scanning apparatus (S9). The drum turret is activated and the scanning drum to be inputted is set at a prescribed reading position (S10). The main axis and the scanning drum are coupled in the rotation transmitting portion (S11). The scanning drum is rotated by the main scanning driving device (S12). The input scanning head is moved to the reading start point according to the setup data (S13). The input scanning head is moved in the subscanning direction (S14). Images to be recorded are inputted according to the setup data and recorded simultaneously (S15). Said input is continued to the trimming end point set by the setup data (S16). The input scanning head is held at a prescribed rest position (S17). The operations of S10 to S17 are repeated for all of the scanning drums attached to the drum turret (S18 and S19). After the completion of image input for all of the scanning drums, the power supply to the main scanning motor and the subscanning motor is turned off (S20), thus the scanning of images is completed.

The above described recording of the inputted images may be carried out on-line and on real time, simultaneously with the input in the image recording apparatus. The image recording data may be stored in an image signal memory portion having large capacitance such as a magnetic disk, after the reading. In such case, image layout or the like can be changed before recording the images.

Figure 7:
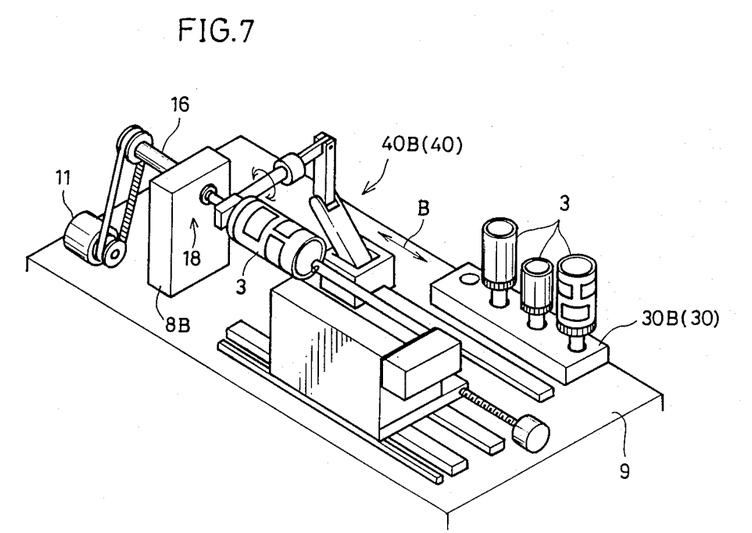
FIGS. 7, 8 and 9 are perspective views showing various embodiments of the scanning drum holding devices.

FIG. 7 is a perspective view showing a first modification of the scanning drum holding means and the scanning drum selecting means. The drum holding means 30 is provided on a base 9 and comprises a drum supporting base 30B capable of holding a plurality of scanning drums 3·3 . . . The drum selecting means 40 comprises a robot arm 40B provided on the supporting base 9 movable in the direction of the arrow B. The scanning drum 3 is attached to the scanning drum mate means 2 or removed from the scanning drum mate means by the robot arm 40B.

Figure 8:
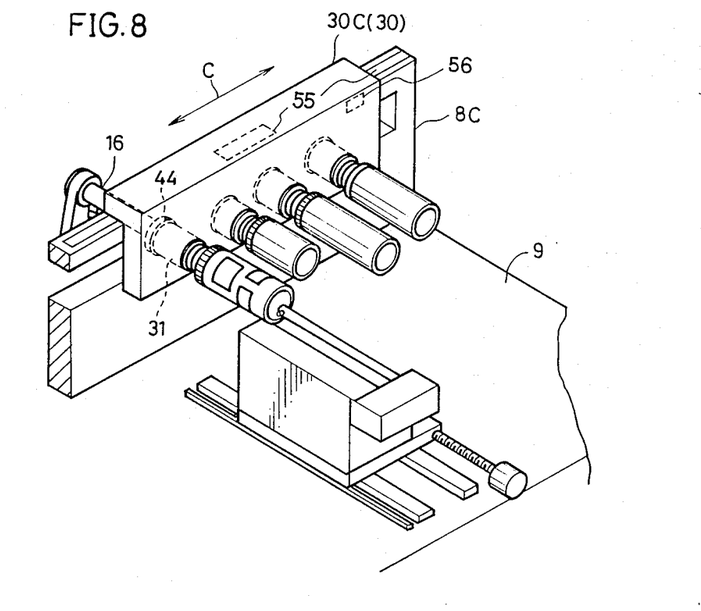

FIG. 8 is a perspective view of a second modification of the scanning drum holding means and the scanning drum selecting means. The drum holding means 30 comprises a drum supporting base 30C slidably mounted on a sliding base frame 8c in the direction orthogonal (arrow C) to the subscanning direction. Each of the scanning drums 3·3 . . . are detachably attached to each of the scanning drum mate means 2·2 . . . arranged in a line extending in the sliding direction. The drum exchange means 40 comprises a push and pull driving means such a linear motor 55, and the position detector such as the linear encoder 56. The rotary driving power of the main axis 16 is transmitted to the scanning drum 4 through such transmitting clutch 44 as shown in FIG. 4.

Figure 9:
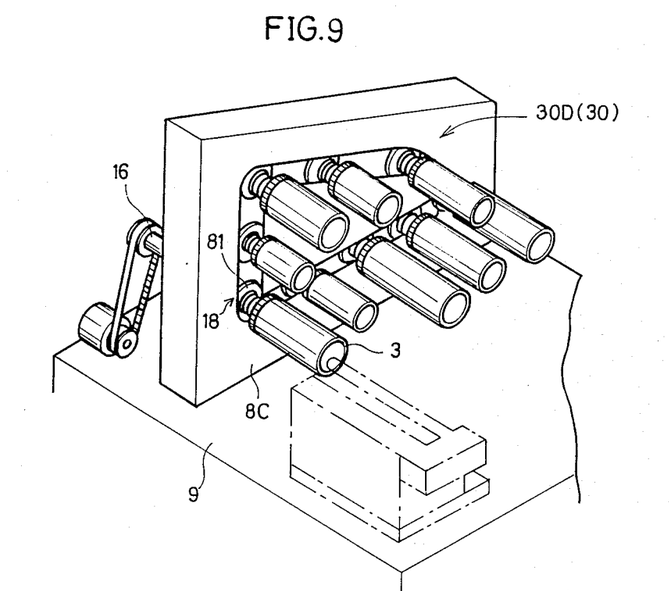

FIG. 9 is a perspective view showing a third modification of the scanning drum holding means and the scanning drum selecting means. The drum holding means 30 comprises a plurality of rollers 81 holding the scanning drum mate means 2 and a guide supporting frame 8c including a guide for successively holding the plurality of rollers 81. The roller 81 has a sprocket 84 on the other side of the drum holding portion 32 and the guide supporting frame 8c has a fixed chain 82 which is to be engaged with the sprocket 84.

Figure 10:
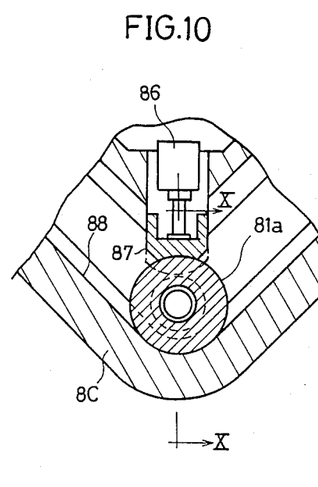
FIG. 10 is a detailed cross sectional view of the revolution transmitting portion of FIG. 9.
Figure 11:
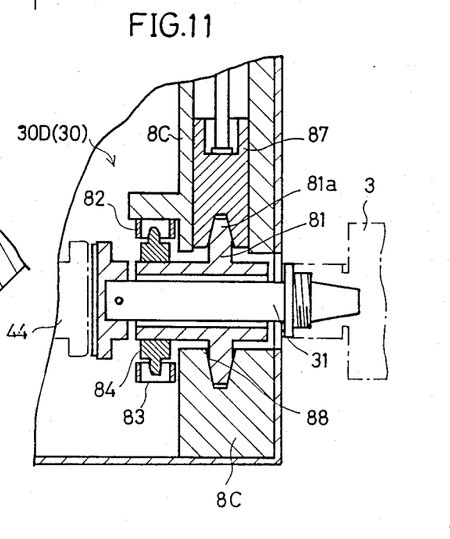
FIG. 11 is a cross sectional view taken along the line X—X in FIG. 10.

The scanning drum selecting means comprises a driving motor, not shown, a driving chain 83 driven by the driving motor and a fixture 87 for fixing the roller. The fixing of the scanning drum is performed as follows. The driving motor drives the driven chain 83 and moves the roller 81 to the rotation transmitting portion 18 by means of the sprocket 84. The rotary driving power of the main axis 16 is transmitted to the scanning drum 3 through the above described transmission clutch 44. FIG. 10 is a cross sectional view of a main position of the rotation transmitting portion 18 of FIG. 9 and FIG. 11 is a cross sectional view taken along the line X—X of FIG. 10. When the roller 81 is positioned at the rotation transmitting position 18, a roller fixture 87 activated by a hydraulic cylinder 86 presses the collar portion 81a of the roller 81 to the corner of a guide trench 88 of the guide supporting frame 8c. The scanning drum 3 is fixed in this manner.

The exchange of the scanning drum is carried out in the following manner. The roller fixture 87 is returned to the original position. The driving chain 83 is activated, the scanning drum which has been inputted is moved from the corner portion and the next scanning drum is moved to the corner portion of the guide trench 88 in which the rotation transmitting portion 18 exists.

Meanwhile, in the above described first, second and third modifications of the scanning drum holding means and the scanning drum selecting means, the order of inputting the setup data and the reading order of the corresponding scanning drums must be the same. This requirement is accomplished by employing the same means as in the case of the above described drum turret.

A conventional drum scanning type image scanning apparatus performs the attachment of the scanning drum to the scanning drum holding means, rotation of the scanning drum in the main scanning direction based on the setup data and the operation such as moving of the reading device in the subscanning direction for every single scanning drum one by one.

In contrast to the conventional apparatus, the drum scanning type image scanning apparatus of the present invention is capable of automatically and successively performing the attachment of the scanning drum to the scanning drum holding means, rotation of the scanning drum in the main scanning direction based on the setup data and the operation such as moving the reading device in the subscanning direction for a plurality of scanning drums.

Consequently, processing of a plurality of originals held in a plurality of scanning drums can be carried out for a long time without an operator. Therefore, the operation efficiency of the image scanning apparatus is enhanced and the running cost of the apparatus can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drum scanning type image scanning apparatus, comprising:
   scanning drum holding means for detachably holding a plurality of scanning drums, each of said scanning drums containing one or more originals to be scanned thereon;

scanning drum selecting means for moving a selected one of said plurality of scanning drums to a scanning position;

main scanning direction rotation means for rotating said selected scanning drum in a main scanning direction;

original reading means located at said scanning position for reading an original located on said selected scanning drum;

setup data storing means operatively connected to said scanning drum selecting means, said main scanning direction rotation means and to said original reading means for storing setup data relating to each of said originals arranged on said plurality of scanning drums; and control means for controlling said scanning drum selecting means, said main scanning direction rotation means and said original reading means such that a desired said scanning drum is selected based on said setup data to read a desired said original.

2. An image scanning apparatus according to claim 1, wherein said main scanning direction rotation means is provided at said scanning position and said scanning drum selecting means comprises scanning drum moving means for bringing said selected scanning drum to said main scanning direction rotation means at said scanning position.

3. An image scanning apparatus according to claim 2, wherein said scanning drum moving means comprises means for moving said scanning drum holding means.

4. An image scanning apparatus according to claim 3, wherein:

said scanning drum holding means includes a disk shaped holder which is rotatable about an axis and said plurality of scanning drums are located at spaced locations along a circumference which is coaxial with said axis;

said means for moving scanning drum holding means comprises means for rotating said holder around said axis; and said scanning position is a prescribed position on said circumference.

5. An image scanning apparatus according to claim 4, wherein:

(A) said scanning drum holding means comprises:
 (1) a plurality of mate means for mounting respective scanning drums to said disk shaped holder; and
 (2) a plurality of rotary axles, each of said rotary axles for permitting said mate means to be rotated about a respective axis; and (B) said main scanning direction rotation means comprises means for transmitting rotary power to that said rotary axle associated with said scanning drum located at said scanning position.

6. An image scanning apparatus according to claim 5, wherein said main scanning direction rotation means comprises a selective coupling means for selectively transmitting the rotary power to said rotary axle associated with said scanning drum located at said scanning position.

7. An image scanning apparatus according to claim 4, wherein said disk shaped scanning drum holding means includes rotary driving means for rotating said holder.

8. An image scanning apparatus according to claim 7, wherein said rotary driving means comprises means for detecting the rotary position of said disk shaped holder.

9. An image scanning apparatus according to claim 8, which further comprises means for positioning said disk shaped holder in response to the detection output of said detection means.

10. An image scanning apparatus according to claim 8, wherein said means for detecting said position comprises a rotary encoder, and wherein said apparatus further comprising means for positioning said disk shaped holder in response to the detection output of said rotary encoder.

11. An image scanning apparatus according to claim 6, wherein said main scanning direction rotation means comprises means for detecting the position of that said rotary axle associated with that said scanning drum located at said scanning position.

12. An image scanning apparatus according to claim 11, which further comprises means for positioning said rotary axle associated with that said scanning drum located at said scanning position in response to the detection output of said detection means.

13. An image scanning apparatus according to claim 11, wherein said means for detecting said position comprises a rotary encoder, and wherein said apparatus further comprising means for positioning said rotary axle associated with that said scanning drum located at said scanning position in response to the detection output of said rotary encoder.

14. An image scanning apparatus according to claim 5, wherein each of said mate means comprises a respective screw.

15. An image scanning apparatus according to claim 3, wherein:

said scanning drum holding means comprises a holder for holding said plurality of scanning drums along a straight line;

said means for moving said scanning drum holding means comprises means for moving said holder back and forth so as to move said scanning drums back and forth along said straight line; and said scanning position is located at a prescribed position on said straight line.

16. An image scanning apparatus according to claim 15, wherein:

(A) said scanning drum holding means comprises:
 (1) a plurality of mate means each for mounting a respective said scanning drum; and
 (2) a plurality of rotary axles, each said axle for permitting an associated said mate means to be rotated about a respective axis; and (B) said main scanning direction rotation means comprises means for transmitting rotary power to that said rotary axle associated with said scanning drum located at said scanning position.

17. An image scanning apparatus according to claim 16, wherein said main scanning direction rotation means comprises a selective coupling means for selectively transmitting rotary power to said rotary axle associated with said scanning drum located at said scanning position.

18. An image scanning apparatus according to claim 15, wherein said means for moving said scanning drum holding means back and forth comprises means for detecting the position of said scanning drum holding means along said straight lines.

19. An image scanning apparatus according to claim 18, which further comprises means for positioning said scanning drum holding means in response to the detection output of said detection means.

20. An image scanning apparatus according to claim 18, wherein said position means comprises a linear encoder, and said apparatus further comprises
means for positioning said scanning drum holding means in response to the detection output of said linear encoder.

21. An image scanning apparatus according to claim 15 wherein said means for moving said scanning drum holding means back and forth comprises a reciprocating driving source.

22. An image scanning apparatus according to claim 17, wherein said main scanning direction rotation means comprises means for detecting the rotary position of said rotary axle associated with said scanning drum located at said scanning position.

23. An image scanning apparatus according to claim 22, which further comprises means for positioning said rotary axle associated with said scanning drum located at said scanning position in response to the detection output of said detection means.

24. An image scanning apparatus according to claim 22, wherein said position detecting means comprises a rotary encoder, and said apparatus further comprises means for positioning said rotary axle associated with said scanning drum located at said scanning position in response to the detected output of said rotary encoder.

25. An image scanning apparatus according to claim 16 wherein each said mate means comprises a respective screw.

26. An image scanning apparatus according to claim 3 wherein:
said scanning drum holding means comprises means for holding said plurality of scanning drums and permitting them to be moved along an endless path; and
said scanning drum moving means comprises moving means for moving said scanning drum holding means to cause said selected scanning drum to be moved to said scanning position.

27. An image scanning apparatus according to claim 26, wherein said means for holding comprises a plurality of support means, each said support means for holding a respective said scanning drum, each of said support means being moveable along said endless path.

28. An image scanning apparatus according to claim 27, wherein each of said support means rotatably supports a respective said scanning drum.

29. An image scanning apparatus according to claim 28, wherein said scanning drum holding means comprises an endless trench, and
each of said support means has a convex portion movably received in said endless trench.

30. An image scanning apparatus according to claim 29, wherein:
each of said support means comprises a respective mate means for mounting a respective said scanning drum and a rotary axle for rotatably mounting its respective said mate means; and
said main scanning direction rotation means comprises means for transmitting rotary power to that said rotary axle whose respective scanning drum is located at said scanning position.

31. An image scanning apparatus according to claim 30, wherein said main scanning direction rotation means comprises a selective coupling means for selectively transmitting rotary power to that said rotary axle whose respective scanning drum is located at said scanning position.

32. An image scanning apparatus according to claim 31, wherein said main scanning direction rotation means comprises means for detecting the rotational position of said rotary axle whose respective scanning drum is located at said scanning position.

33. An image scanning apparatus according to claim 32, which further comprises means for positioning said rotary axle whose respective scanning drum is located at said scanning position in response to the detection output of said detection means.

34. An image scanning apparatus according to claim 32, wherein said position detecting means comprises a rotary encoder, and wherein said apparatus further comprising means for positioning said rotary axle whose respective scanning drum is located at said scanning position in response to the detection output of said rotary encoder.

35. An image scanning apparatus according to claim 30, wherein each said mate means comprises a respective screw.

36. An image scanning apparatus according to claim 29, wherein said endless trench has a corner portion and said corner portion is said scanning position.

37. An image scanning apparatus according to claim 36, wherein:
said endless trench comprising a first portion extending from an upper position to said scanning position and a second portion extending from said scanning position to another position; and
said scanning drum moving means comprises means for moving said scanning drums in order around said trench whereby succeeding scanning drums are brought to said scanning position.

38. An image scanning apparatus according to claim 36, which further comprises means for anchoring that said support means located at said corner portion of the trench, whereby said scanning drum is kept stable at said scanning position to be rotated by said main scanning direction rotation means.

39. An image scanning apparatus according to claim 2, wherein:
said scanning drum holding means is provided at a position remote from said scanning position; and
said scanning drum moving means comprises scanning drum carrying means for carrying said selected scanning drum from said scanning drum holding means provided at said remote position to said main scanning direction rotation means provided at said scanning position.

40. An image scanning apparatus according to claim 39, wherein:
said scanning drum holding means comprises means for holding said scanning drums in a predetermined arrangement; and
said scanning drum carrying means comprises means for carrying said selected scanning drum from said scanning drum holding means to said scanning position.

41. An image scanning apparatus according to claim 40, wherein said scanning drum carrying means comprises means controllably moved between said remote position and said scanning position for gripping and releasing said selected scanning drum and moving it between said remote position and scanning positions.

42. An image scanning apparatus according to claim 39, wherein said main scanning direction rotation means comprises:
   mate means for mounting said selected scanning drum at said scanning position;
   a rotary axle for rotatably supporting said mate means; and
   rotary power transmitting means for rotating said rotary axle.

43. An image scanning apparatus according to claim 42, wherein said main scanning direction rotation means further comprises means for detecting the rotary position of said rotary axle.

44. An image scanning apparatus according to claim 43, which further comprises means for positioning said rotary axle in response to the detected output of said detection means.

45. An image scanning apparatus according to claim 43, wherein said position detecting means comprises a rotary encoder, and wherein said apparatus further comprises means for positioning said rotary axle in response to the detected output of said rotary encoder.

46. An image scanning apparatus according to claim 42, wherein said mate means comprises a screw.

47. An image scanning apparatus according to claim 2, wherein said original reading means comprises a reading head for reading that said original located at said scanning position.

48. An image scanning apparatus according to claim 47, wherein said original reading means comprises scanning drum reading means movable back and forth along the direction of an axis of said scanning drum located at said scanning position.

49. In a drum scanning type image scanning apparatus comprising scanning drum holding means for detachably holding a plurality of scanning drums; scanning drum selecting means for selecting an arbitrary one of said plurality of scanning drums for a scanning operation; main scanning direction rotation means for rotating said selected scanning drum in the main scanning direction; original reading means for reading each original on said selected scanning drum, and setup data storing means operatively connected to said scanning drum selecting means, said main scanning direction rotation means and to said original reading means for storing setup data concerning originals arranged on said plurality of scanning drums; a method for controlling the drum scanning type image scanning apparatus comprising the steps of:
   holding said plurality of scanning drums at said scanning drum holding means;
   selecting one of said plurality of scanning drums by said scanning drum selecting means;
   rotating said selected scanning drum in the main scanning direction by said main scanning direction rotation means; and
   reading said selected scanning drum by said reading means based on said setup data.

50. Method for controlling an image scanning apparatus according to claim 49, wherein: said main scanning direction rotation means is provided at a scanning position; said scanning drum selecting means comprises scanning drum moving means for bringing said selected scanning drum to said main scanning direction rotation means at said scanning position; said scanning drum moving means comprises means for moving said scanning drum holding means; said scanning drum holding means has a disk form for holding said plurality of scanning drums along a single circumference and comprises a disk shaped holder rotatable around a central axle; said means for moving said scanning drum holding means comprises means for rotating said disk form scanning drum holding means around said central axle; and said main scanning direction rotation means is provided at a prescribed position along said circumference; and wherein:
   said step of holding said plurality of scanning drums in the scanning drum holding means comprises the step of holding said plurality of scanning drums in said holder;
   said step of selecting one of said plurality of scanning drums comprises a step of rotating said holder; and
   said method further comprising the step of selecting the next scanning drum by rotating said holder after said reading step.

51. Method for controlling an image scanning apparatus according to claim 49, wherein said main scanning direction rotation means is provided at a scanning position; said scanning drum selecting means comprises scanning drum moving means for bringing said selected scanning drum to said main scanning direction rotation means at said scanning position; said scanning drum moving means comprises means for moving said scanning drum holding means; said scanning drum holding means comprises a rectangular shaped holder for holding said plurality of scanning drums in a line; said means for moving said scanning drum holding means comprises means for moving said rectangular holder in the left and right direction; said main scanning direction rotation means exists at a prescribed position on said line; and wherein:
   said step of holding said plurality of scanning drums in said scanning drum holding means comprises the step of holding said scanning drum on said rectangular holder;
   said step of selecting one of said plurality of scanning drums for a scanning operation comprises the step of selecting said one of said plurality of scanning drums by moving said rectangular holder in the left and right direction; and wherein said method further comprising the step of selecting the next scanning drum to be scanned by moving said rectangular holder in the left and right direction after said reading step.

52. Method for controlling an image scanning apparatus according to claim 49, wherein said main scanning direction rotation means is provided at a scanning position; said scanning drum selecting means comprises scanning drum moving means for bringing said selected scanning drum to said main scanning direction rotation means at said scanning position; said scanning drum moving means comprises means for moving said scanning drum holding means; said scanning drum holding means comprises an endless holding means for holding said plurality of scanning and drums enabling said scanning drums to be moved along an endless path; said scanning drum moving means comprises means for moving said selected scanning drum to said scanning position; said main scanning direction rotation means exist at said scanning position, and wherein:
   said step of holding said plurality of scanning drums in said scanning drum holding means comprises the step of holding said scanning drums in said endless holding means;
   said step of selecting one of said scanning drums for a scanning operation is carried out by said moving means; and wherein said method further comprising the step of selecting the next scanning drum by enabling said moving means after said reading step.

53. Method for controlling an image scanning apparatus according to claim 49, wherein: said main scanning direction rotation means is provided at a scanning position; said scanning drum selecting means comprises scanning drum moving means for bringing said selected scanning drum to said main scanning direction rotation means at said scanning position; said scanning drum holding means is provided at a second position; said scanning drum moving means comprises scanning drum carrying means for carrying said selected scanning drum from said scanning drum holding means provided at said second position to said main scanning direction rotation means provided at said scanning position; and wherein:

said step of holding said plurality of scanning drums in said scanning drum holding means comprises the step of holding said plurality of scanning drums in said scanning drum holding means provided at said second position;

said step of selecting one of said scanning drums for a scanning operation is carried out by said scanning drum carrying means; and said method further comprising the step of selecting the next scanning drum to be scanned by enabling said scanning drum carrying means after said reading step.

* * * * *